Jan. 9, 1962 E. J. HOLDEMAN 3,016,254
GASKET FOR RAILROAD COMPRESSED AIR HOSES
Filed Oct. 10, 1958
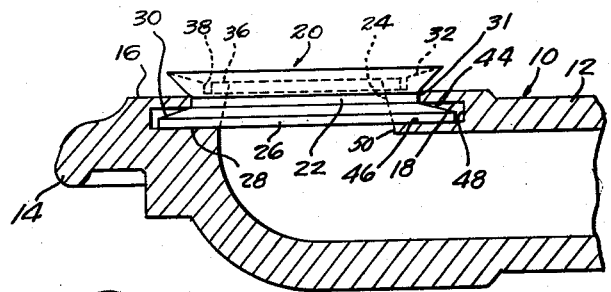
INVENTOR.
EUGENE J. HOLDEMAN,
BY
McMorrow, German + Davidson
ATTORNEYS.

United States Patent Office 3,016,254
Patented Jan. 9, 1962

3,016,254
GASKET FOR RAILROAD COMPRESSED
AIR HOSES
Eugene J. Holdeman, 1419 Demeter Drive, Freeport, Ill.
Filed Oct. 10, 1958, Ser. No. 766,568
5 Claims. (Cl. 288—23)

This invention relates generally to gaskets for the air hose coupling heads of railroad cars. More particularly, the invention has reference to a generally improved gasket that is specifically designed for use in coupling heads of this type, and that has a novel shape and composition that is productive of an improved sealing action, while at the same time increasing the life of the gasket.

The present invention, in some respects, constitutes an improvement over the gasket shown and claimed in my Patent No. 2,842,388, issued July 8, 1958.

In the present invention, certain characteristics found in the gasket shown in the above designated patent are retained. In particular, in the gasket according to the present invention there is included the arrangement wherein the top surface of the gasket has, medially between the outer and inner peripheries thereof, an annular, continuous groove, reducing the thickness of the gasket body at the location of the groove, and defining at opposite sides of the groove outer and inner ring sections having different but cooperating characteristics with respect to flexure and sealing action.

In accordance with the present invention, the gasket includes a beveled top surface portion, defined between the above mentioned annular groove and the outer periphery of the top surface, the bevel of the top surface being particularly designed to insure a smooth outward movement of the outer gasket section under the pressure of an adjacent, contacting component of the air hose coupling.

Further, in accordance with the present invention, there is provided an improved circumferential lip or base on the gasket, the particular shape of which, relative to the gasket-receiving internal groove of the air hose coupling head, is designed to reduce wear on the contact surfaces of the gasket while at the same time promoting uniformity of wear. In accordance with the present invention, the particular shape of the lip or base flange is coactively related to the use of a graphite compound in the rubber mixture (or any other material suitable for this use and gasket action) of which the gasket is formed, in such a manner as to produce a slippage in a circumferential direction, whereby the gasket will be caused to turn in a manner to reduce the mentioned wear and, at the same time, promote uniformity of wear through the full circumference of the gasket.

Another object is to provide a construction such that the lubricating action induced in the construction by the incorporation of the graphite in the gasket material, will serve to prevent corrosion resulting from exposure of the gasket and coupling head gasket slot to the elements and to inner corrosive factors, resulting from any application in which the gasket may be used. In this way, it is proposed to reduce maintenance costs involved in the preparation of a suitable seat for a gasket, whenever corrosive effects have occurred.

Another object is to provide, in a gasket of the character stated, a construction which, in at least one form of the gasket, will produce an in-and-out motion of the inner section of the gasket body, that is, motion in a direction radially inwardly or outwardly of the gasket. In this way, it is proposed that when the gasket is under heavy internal pressure against the inner periphery thereof, said pressure will be transmitted to the inner ring section, to press the same against the outer ring section, said outer ring section being one contact section of the gasket, as both rings contact opposing gasket surfaces. The purpose of the outer ring is to seal against leakage around the outer sides of the gaskets, whereby to improve the sealing action.

Another object is to provide a tapered formation on the inner surface of the gasket, so designed as to quickly impart a sure downward pressure to the outer ring section for the purpose of sealing effectively the outer edge of the gasket against the adjacent components of the air hose coupling head.

Another object of importance is that the inward taper of the inside ring will provide a restriction on volume through the gasket and increased velocity at coupling head, the purpose of this being to reduce back pressure at coupling head, and to smooth out the action of the volume flow.

Still another object is to provide a gasket of the character stated which, despite the generally specifically improved construction thereof, will nevertheless be capable of manufacture at low cost, while at the same time being shaped to facilitate installation or removal during ordinary maintenance of the compressed air lines of railroad cars.

Other objects will appear from the following description, the claims appended thereto, and from the annexed drawing in which like reference characters designate like parts throughout the several views and wherein:

FIGURE 1 is a sectional view taken longitudinally through a conventional air hose coupling head of a railroad car, with the improved gasket being shown in elevation mounted in said coupling head;

FIGURE 2 is a top plan view of the gasket per se;

FIGURE 3 is an enlarged, detail sectional view on line 3—3 of FIGURE 2;

FIGURE 4 is a view like FIGURE 1 showing a modified construction;

FIGURE 5 is a top plan view of the modified gasket of FIGURE 4; and

FIGURE 6 is a detail sectional view on an enlarged scale, taken on line 6—6 of FIGURE 5.

Referring to the drawing in detail, generally designated at 10 is a railroad compressed air hose coupling head, formed at one end with a tubular extension 12. At the other end of the coupling head there is provided a circular portion 14 having a flat top surface 16 centrally apertured to provide communication with the bore of the head. The center opening of the top portion of the coupling head has a continuous, inwardly facing, deep recess or annular groove 18.

All this is conventional construction and does not, per se, comprise part of the present invention.

The improved gasket comprising the present invention has been generally designated 20 in FIGURES 1–3. Said gasket is formed of a single piece of material, and in accordance with the invention, a rubber material, having the requisite characteristics of compressibility, is employed, with a graphite compound 21 being dispersed uniformly throughout the material of the gasket. The function of the graphite compound will be described in detail hereinafter, since it has an important relationship to the shape of the gasket, in a manner such as to produce an improved sealing action concurrently with a reduction in wear and an increase in uniformity of wear.

In any event, the gasket 20 in accordance with the present invention comprises an annular, continuous body portion 22, having a center opening the wall 24 of which is tapered, the diameter of said center opening being progressively increased in a direction from the top of the gasket to the bottom surface thereof.

Integrally formed upon the body 22 is an outwardly directed, continuous base annular flange or lip 26. Lip 26 has a bottom surface 28 disposed wholly in a plane perpendicular to the axis of the gasket body. Bottom surface 28 is flat over the full distance between the outer circumference of the lip 26 and the intersection of the bottom surface of the gasket with the inner side surface 24 thereof.

Designated at 30 is a top surface of the base flange or lip, and as will be seen in FIGURE 3, this is sloped downwardly outwardly toward the outer periphery of the lip. The slope is continuous, so that the lip is progressively increased in thickness in a direction from its outer periphery to the side wall 31 of the gasket body.

Designated at 32 is the top surface of the gasket. This may be considered as being divided into an annular outer surface portion 34 and an annular inner surface portion 36, said portions being separated by an outwardly opening, relatively deep, narrow groove 38. The material of the gasket body is thus of minimum thickness, in the sense of the dimension between the top surface 32 and the bottom surface 28, at the location of the groove 38.

Designated at 40 is an inclined top portion of the outer side wall of the gasket body. Top portion 40 of the outer side wall is tapered in a direction toward the bottom surface 28, merging at its smaller end into the surface 31. Portion 40 of the outer side surface is at an acute angle to the outer surface portion 34 of top surface 32, the surface portions 34, 40 extending into convergence at the outer periphery of the top surface 32, so as to define an outwardly directed upper annular flange or lip 42 of acute-angular cross section, the top and bottom surfaces of which are both inclined in respect to the vertical and horizontal.

Referring to FIGURE 1, the base or lip 26 engages in the groove 18 of the coupling head. The groove 18 is of rectangular cross section, having an upper flange 44 which is parallel to the lower flange 46 and perpendicular to the inner wall 48 of the groove. The lower flange 46 extends inwardly from wall 48 a distance greater than that which the top surface extends inwardly from said wall 48. As a result, the lower flange 46 projects radially inwardly of the center opening of the coupling head, beyond the upper flange 44.

The lip 26 engages in the groove 18, with the outer periphery of the lip 26 being spaced inwardly a short distance from the wall 48 as clearly seen in FIGURE 1.

The bottom surface 28 is disposed flat against the bottom surface 46 of recess 18. Top surface 30 of the lip 26, however, is spaced from the surface 44 by reason of its being a sloped surface as distinguished from the surface 44 which is perpendicular to the axis of the gasket.

As will be noted, the top surface 30 contacts the surface 44 of recess 18 at the inner periphery of the surface 44, with the surface 31 of the gasket body bearing against the wall of the center opening of the coupling head immediately above the recess.

This reduces to a minimum the amount of contact between the body of the gasket and the surface of the coupling head, while still insuring that the gasket will be held in proper position to produce an effective sealing action even under heavy pressures.

In this connection, the incorporation of the graphite compound in the rubber material of the gasket is so designed as to produce a lubricating action, tending to deliberately create slippage of the gasket in a circumferential direction in its seat 18. This characteristic of the gasket results not only from the nature of the material of the gasket, but also, from the particular cross sectional shape of the base flange relative to the cross sectional shape of the recess or seat 18 provided for the gasket in the conventional air hose coupling head.

It is also to be noted that in this form of the invention, the taper of the surface 24 is such as to cause said surface to merge smoothly into the lowermost portion 50 of the center opening of the coupling head. Surface 24 does not become fully equal in diameter to the portion 50. It does, however, recuperate diameter under pressure by closing the width of the flexible groove, but not fully. Otherwise, there would not be achieved the desired restriction in volume diameter. Of course, this full diameter could be brought about by reducing the thickness of the outer ring with a wider flexible groove.

In addition, the arrangement illustrated and described defines an inner ring section 52 between the groove 38 and the surface 24, and an outer ring section 54 between the groove 38 and the outer periphery of the top surface 32 of the gasket. These sections may flex relative to one another, due to the reduced thickness of the gasket body therebetween caused by the groove 38. The arrangement has desirable characteristics, in relation to the bevel of the surface 34. It has been found that this produces a smooth movement of the outer ring section 54 radially outwardly of the opening of the coupling head, under pressure of contact with adjacent components of the coupling.

In addition, the inner ring section is caused, when there is internal pressure of a substantial degree against the surface 24, to be flexed outwardly against the outer ring section, providing an improved sealing action at the outer periphery of the gasket.

In the form of the invention shown in FIGURES 4–6, the essential characteristics of the first form are retained. However, there are certain modifications which will be described in detail hereinafter.

In this form, the gasket 20a includes a body 22a which, as in the first form of the invention, comprises rubber material having freely dispersed therethrough particles of a graphite compound. The body 22a is integral with a base flange or lip 26a. Further, body 22a has an inner surface 24a. As distinguished from the first form of the invention, surfaces 24a is fully perpendicular to the plane of the bottom surface 28a, that is, it is parallel to the axis of the gasket.

Lip 26a has a sloped top surface 30a, so that in this respect the modified gasket functions identically to the first form of the gasket when engaged in its seat 18.

The outer side surface 40a of the gasket, in this form, is not sloped, but rather, is parallel to the gasket axis.

The top surface 32a includes a sloped outer surface portion 34a separated from a flat inner surface portion 36a by a groove 38a. This is identical to the arrangement in the first form of the invention, and as a result, there is provided an inner ring section 52a which is adapted to be forced outwardly toward an outer ring section 54a responsive to heavy internal pressures. The sealing action of the gasket is thus improved. This results from the particular shape of the gasket. The increase of height of outer ring over the height of the inner ring creates a tighter bond and increases the friction of contact surfaces when two coupling heads with this type of gasket in them, are coupled together. With a graphite additive in the gaskets to permit slippage, the gasket shoe slides in both coupling heads, lubricating the metal slot by wear of the gasket shoe against the metal. The only wear on the contact surfaces is induced on the act of coupling the heads together, though there may be small wear in use. The major wear would be in the shoe, as the swaying or flexible movement of hoses moves only the shoes of gaskets.

In both forms, there is the circumferential slippage or turning movement, designed to produce evenness of wear, while increasing measurably the life of the gasket. This results from the particular shape of the gasket, quite possibly, and it is believed that there is also a coactive relationship between the shape of the gasket and the materials used, designed to produce said turning action.

It is believed apparent that the invention is not necessarily confined to the specific use or uses thereof described above since it may be utilized for any purpose to which it may be suited. Nor is the invention to be

What is claimed is:

1. In combination, an air pressure hose head having a circular opening having a sidewall, an annular groove indenting said sidewall, said groove defining parallel spaced upper and lower flanges, the upper flange having an inner edge spaced radially outwardly from the inner edge of the lower flange, a flexible and compressible annular gasket having an annular flange engaged in said groove, said gasket flange having an outwardly and downwardly declining tapered upper surface a major portion of which is spaced out of contact with the upper head flange and a minor inward portion engaged with the upper head flange, said gasket flange having a flat horizontal under surface engaged throughout with the lower head flange, said gasket having an upper portion above its flange extending above the upper head flange and having a peripheral surface in contact with the inner edge of the upper head flange.

2. In combination, an air pressure hose head having a circular opening having a sidewall, an annular groove indenting said sidewall, said groove defining parallel spaced upper and lower flanges, the upper flange having an inner edge spaced radially outwardly from the inner edge of the lower flange, a flexible and compressible annular gasket having an annular flange engaged in said groove, said gasket flange having an outwardly and downwardly declining tapered upper surface a major portion of which is spaced out of contact with the upper head flange and a minor inward portion engaged with the upper head flange, said gasket flange having a flat horizontal under surface engaged throughout with the lower head flange, said gasket having an upper portion above its flange extending above the upper head flange and having a peripheral surface in contact with the inner edge of the upper head flange, the central opening of the gasket having an upwardly tapered sidewall whose larger lower end is flush with the inner edge of the lower head flange.

3. In combination, an air pressure hose head having a circular opening having a sidewall, an annular groove indenting said sidewall, said groove defining parallel spaced upper and lower flanges, the upper flange having an inner edge spaced radially outwardly from the inner edge of the lower flange, a flexible and compressible annular gasket having an annular flange engaged in said groove, said gasket flange having an outwardly and downwardly declining tapered upper surface a major portion of which is spaced out of contact with the upper head flange and a minor inward portion engaged with the upper head flange, said gasket flange having a flat horizontal under surface engaged throughout with the lower head flange, said gasket having an upper portion above its flange extending above the upper head flange and having a peripheral surface in contact with the inner edge of the upper head flange, said upper portion having an upper surface having therein a concentric circular indentation having an outwardly inclined peripheral portion, said upper surface being formed with an annular groove separating the inclined peripheral portion from the remainder of the indentation.

4. In combination, an air pressure hose head having a circular opening having a sidewall, an annular groove indenting said sidewall, said groove defining parallel spaced upper and lower flanges, the upper flange having an inner edge spaced radially outwardly from the inner edge of the lower flange, a flexible and compressible annular gasket having an annular flange engaged in said groove, said gasket flange having an outwardly and downwardly declining tapered upper surface a major portion of which is spaced out of contact with the upper head flange and a minor inward portion engaged with the upper head flange, said gasket flange having a flat horizontal under surface engaged throughout with the lower head flange, said gasket having an upper portion above its flange extending above the upper head flange and having a peripheral surface in contact with the inner edge of the upper head flange, said upper portion having an upper surface having therein a concentric circular indentation having an outwardly inclined peripheral portion, said upper surface being formed with an annular groove separating the inclined peripheral portion from the remainder of the indentation, and an upper radially outwardly and upwardly tapered annular flange on said upper portion of the gasket and spaced above the first-mentioned gasket flange, said upper gasket flange being located above the upper head flange and extending radially thereover and normally out of contact therewith.

5. In combination, an air pressure hose head having a circular opening and a sidewall, an annular groove indenting said sidewall, said groove defining an upper annular flange and a lower annular flange parallel to and spaced downwardly from the upper flange, the upper flange having an inner edge spaced radially outwardly from the inner edge of the lower flange, a flexible and compressible annular gasket having a lower annular flange engaged in said groove, said lower gasket flange having an outwardly and downwardly declining tapered upper surface having a major portion spaced out of contact with the upper head groove and a minor inward portion engaged with the upper head groove, said lower gasket flange having a flat horizontal surface engaged throughout with the lower head flange, said gasket having a peripheral surface portion above its lower flange which is in contact with the inner edge of the upper head flange, the top of the gasket having therein a concentric circular indentation having an outwardly inclined peripheral portion and being formed with an annular groove separating the inclined peripheral portion from the remainder of the indentation, and an upper radially outwardly and upwardly tapered annular flange on said upper portion of the gasket and spaced above the lower gasket flange, said upper gasket flange being located above the upper head flange and extending radially thereover and normally out of contact therewith, the declining upper surface of the lower gasket flange, said peripheral surface, and the upper gasket flange defining a V-shaped annular groove around the periphery of the gasket.

References Cited in the file of this patent
UNITED STATES PATENTS

| | | |
|---|---|---|
| 2,081,040 | King | May 18, 1937 |
| 2,561,132 | Payne | July 17, 1951 |
| 2,842,388 | Holdeman | July 8, 1958 |